(12) United States Patent
Jetcheva et al.

(10) Patent No.: US 9,167,496 B2
(45) Date of Patent: *Oct. 20, 2015

(54) ROUTE OPTIMIZATION FOR ON-DEMAND ROUTING PROTOCOLS FOR MESH NETWORKS

(71) Applicant: Firetide, Inc., Campbell, CA (US)

(72) Inventors: Jorjeta Gueorguieva Jetcheva, Los Gatos, CA (US); Sachin Kanodia, San Jose, CA (US); Murali Sundaramoorthy Repakula, San Jose, CA (US); Mohan Natarajan, San Ramon, CA (US)

(73) Assignee: Firetide, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,461

(22) Filed: May 23, 2014

(65) Prior Publication Data

US 2015/0103813 A1  Apr. 16, 2015

Related U.S. Application Data

(63) Continuation of application No. 13/204,902, filed on Aug. 8, 2011, now Pat. No. 8,737,268, which is a continuation of application No. 12/014,802, filed on Jan. 16, 2008, now Pat. No. 7,995,501, which is a (Continued)

(51) Int. Cl.
*H04W 40/02* (2009.01)
*H04W 40/20* (2009.01)

(Continued)

(52) U.S. Cl.
CPC .............. *H04W 40/02* (2013.01); *H04L 45/122* (2013.01); *H04L 45/22* (2013.01); *H04L 45/26* (2013.01); *H04L 45/36* (2013.01); *H04W 40/28* (2013.01); *H04W 40/34* (2013.01); *H04W 84/18* (2013.01)

(58) Field of Classification Search
CPC ....... H04L 45/122; H04L 45/22; H04L 45/26; H04W 40/34; H04W 84/18
USPC ......... 370/229, 235, 237, 238, 252, 254, 255, 370/315, 338; 709/238, 239, 241, 242, 243; 455/3.01

See application file for complete search history.

(56) References Cited

U.S. PATENT DOCUMENTS 6,993,034 B1 * 1/2006 Block et al. ................... 370/401
7,280,483 B2 * 10/2007 Joshi ............................ 370/238

(Continued)

*Primary Examiner* — Ahmed Elallam
(74) *Attorney, Agent, or Firm* — PatentVentures: Bennett Smith; Korbin Van Dyke

(57) ABSTRACT

Various embodiments implement a set of low overhead mechanisms to enable on-demand routing protocols. The on-demand protocols use route accumulation during discovery floods to discover when better paths have become available even if the paths that the protocols are currently using are not broken. In other words, the mechanisms (or "Route Optimizations") enable improvements to routes even while functioning routes are available. The Route Optimization mechanisms enable nodes in the network that passively learn routing information to notify nodes that need to know of changes in the routing information when the changes are important. Learning routing information on up-to-date paths and determining nodes that would benefit from the information is performed, in some embodiments, without any explicit control packet exchange. One of the Route Optimization mechanisms includes communicating information describing an improved route from a node where the improved route diverges from a less nearly optimal route.

20 Claims, 6 Drawing Sheets

Related U.S. Application Data continuation of application No. PCT/US2006/027732, filed on Jul. 18, 2006.

(60) Provisional application No. 60/806,579, filed on Jul. 5, 2006, provisional application No. 60/709,975, filed on Aug. 19, 2005, provisional application No. 60/707,214, filed on Aug. 11, 2005, provisional application No. 60/700,930, filed on Jul. 20, 2005.

(51) Int. Cl.
  *H04W 40/34* (2009.01)
  *H04W 84/18* (2009.01)
  *H04L 12/733* (2013.01)
  *H04L 12/707* (2013.01)
  *H04L 12/721* (2013.01)
  *H04W 40/28* (2009.01)

(56) References Cited

U.S. PATENT DOCUMENTS

| | | | |
|---|---|---|---|
| 7,349,360 B2* | 3/2008 | Gutierrez et al. | 370/315 |
| 7,561,526 B2* | 7/2009 | Naden et al. | 370/238 |
| 7,570,628 B2* | 8/2009 | Rangarajan et al. | 370/351 |
| 7,636,309 B2* | 12/2009 | Alicherry et al. | 370/230.1 |
| 7,813,340 B2* | 10/2010 | Novaes | 370/389 |
| 7,995,501 B2* | 8/2011 | Jetcheva et al. | 370/255 |
| 8,737,268 B2* | 5/2014 | Jetcheva et al. | 370/255 |
| 2001/0032272 A1* | 10/2001 | Fujita | 709/241 |
| 2002/0186665 A1* | 12/2002 | Chaffee et al. | 370/255 |
| 2004/0029553 A1* | 2/2004 | Cain | 455/403 |
| 2004/0264466 A1* | 12/2004 | Huang | 370/392 |
| 2006/0146717 A1* | 7/2006 | Conner et al. | 370/238 |
| 2007/0184864 A1* | 8/2007 | Leitch et al. | 455/507 |
| 2007/0237081 A1* | 10/2007 | Kodialam et al. | 370/235 |

* cited by examiner

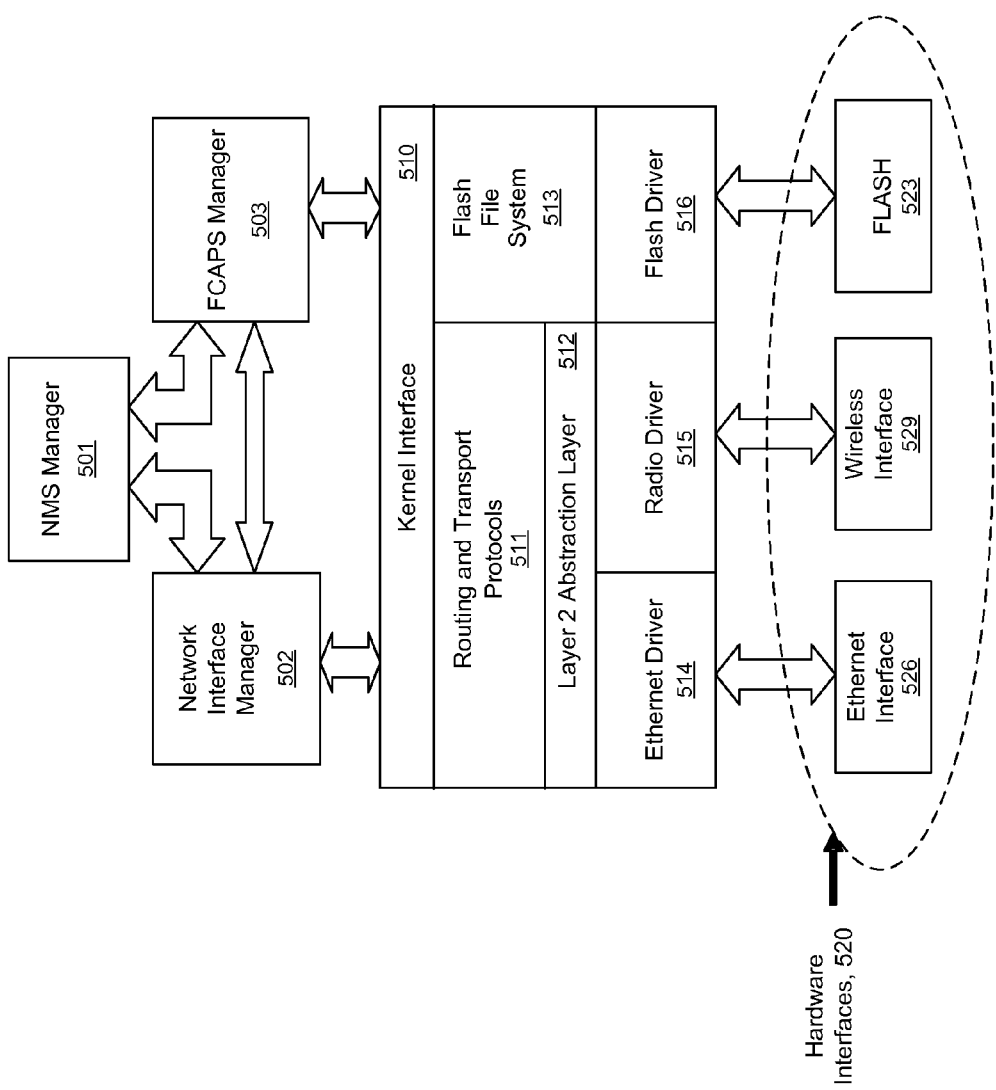

ROUTE OPTIMIZATION FOR ON-DEMAND ROUTING PROTOCOLS FOR MESH NETWORKS

CROSS REFERENCE TO RELATED APPLICATIONS

Priority/benefit claims for this application are made in the accompanying Application Data Sheet. This application incorporates by reference for all purposes the following applications, all owned by the owner of the instant application:

- U.S. application Ser. No. 13/204,902, filed Aug. 8, 2011, now U.S. Pat. No. 8,737,268, first named inventor Jorjeta Jetcheva, and entitled ROUTE OPTIMIZATION FOR ON-DEMAND ROUTING PROTOCOLS FOR MESH NETWORKS;
- U.S. application Ser. No. 12/014,802, filed Jan. 16, 2008, now U.S. Pat. No. 7,995,501, first named inventor Jorjeta Jetcheva, and entitled ROUTE OPTIMIZATION FOR ON-DEMAND ROUTING PROTOCOLS FOR MESH NETWORKS;
- U.S. PCT Application Serial No. PCT/US2006/027732, filed Jul. 18, 2006, first named inventor Jorjeta Jetcheva, and entitled ROUTE OPTIMIZATION FOR ON-DEMAND ROUTING PROTOCOLS FOR MESH NETWORKS;
- U.S. Provisional Application Ser. No. 60/700,930, filed Jul. 20, 2005, first named inventor Jorjeta Jetcheva, and entitled ROUTE OPTIMIZATION FOR ON-DEMAND ROUTING PROTOCOLS FOR MESH NETWORKS;
- U.S. Provisional Application Ser. No. 60/707,214, filed Aug. 11, 2005, first named inventor Jorjeta Jetcheva, and entitled ROUTE OPTIMIZATION FOR ON-DEMAND ROUTING PROTOCOLS FOR MESH NETWORKS;
- U.S. Provisional Application Ser. No. 60/709,975, filed Aug. 19, 2005, first named inventor Jorjeta Jetcheva, and entitled ROUTE OPTIMIZATION FOR ON-DEMAND ROUTING PROTOCOLS FOR MESH NETWORKS; and
- U.S. Provisional Application Ser. No. 60/806,579, filed Jul. 5, 2006, first named inventor Jorjeta Jetcheva, and entitled ROUTE OPTIMIZATION FOR ON-DEMAND ROUTING PROTOCOLS FOR MESH NETWORKS.

BACKGROUND

1. Field

Advancements in routing protocols for mesh networks are needed to provide improvements in performance, efficiency, and utility of use. Embodiments described elsewhere herein enable the improvements.

2. Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes. Nothing herein is to be construed as an admission that any of the references are pertinent prior art, nor does it constitute any admission as to the contents or date of actual publication of these documents.

SUMMARY

The invention can be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention. An exposition of one or more embodiments of the invention is provided in the Detailed Description. The Detailed Description includes an Introduction to facilitate the more rapid understanding of the remainder of the Detailed Description. The Introduction includes Illustrative Combinations that tersely summarize illustrative systems and methods in accordance with the concepts taught herein. As is discussed in more detail in the Conclusions, the invention encompasses all possible modifications and variations within the scope of the issued claims, which are appended to the very end of the issued patent.

BRIEF DESCRIPTION OF THE DRAWINGS

Various embodiments of the invention are disclosed in the following detailed description and the accompanying drawings.

FIG. 5 illustrates selected details of software aspects of an embodiment of a node.

DETAILED DESCRIPTION

Figure 1:
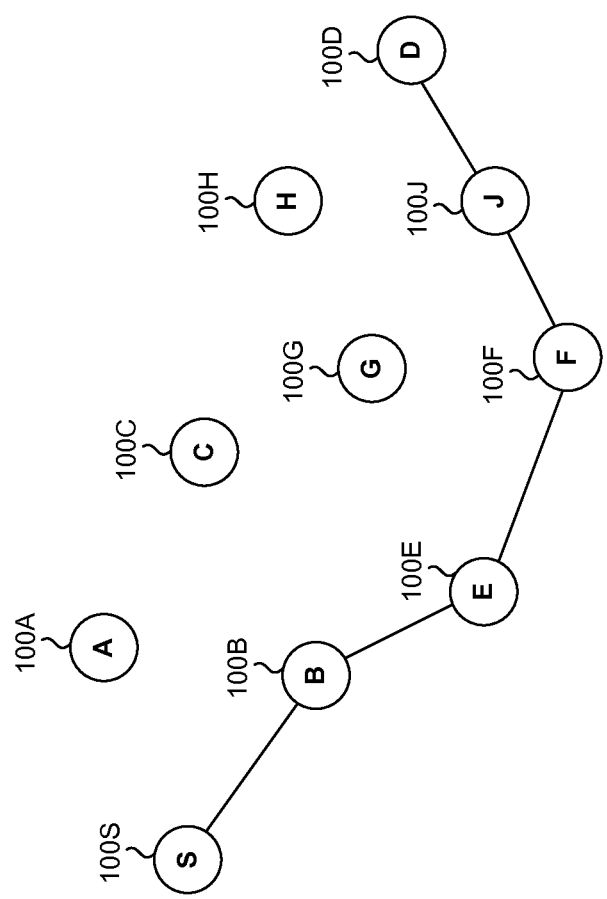
FIG. 1 illustrates selected details of an embodiment of a mesh network and associated path computation, a path through the network, and various entries in a route cache.

The invention can be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification. As is discussed in more detail in the Conclusions, the invention encompasses all possible modifications and variations within the scope of the issued claims, which are appended to the very end of the issued patent.

In some implementations, on-demand routing protocols for mesh networks discover routes only when nodes need to communicate and have no valid route to a destination. As a result, when network topology changes due to movement or addition of new nodes to a network, and when the changes result in better paths to the destination being available, the routing protocol does not discover and use the better paths unless a route the node is currently using breaks. Various embodiments implement a set of low overhead mechanisms to enable on-demand routing protocols using route accumulation during discovery floods to discover when better paths have become available even if the paths that the protocols are currently using are not broken. In other words, the mechanisms (or "Route Optimizations") enable improvements to routes even while functioning routes are available. The Route Optimization mechanisms enable nodes in the network that passively learn routing information to notify nodes that need to know of changes in the routing information when the changes are important. Learning routing information on up-to-date paths and determining nodes that would benefit from the information is performed, in some embodiments, without any explicit control packet exchange. One of the Route Optimization mechanisms includes communicating information describing an improved route from a node where the improved route diverges from a less nearly optimal route.

Terms

Elsewhere herein terms are used to describe selected elements and aspects of various embodiments and implementations. Examples for selected terms follow.

Node: An example of a node is an electronic device.

Packet: An example of a packet is that nodes communicate information to each other that is subdivided into packets.

Link: An example of a link is a conceptual representation of the ability of two (or more) nodes to communicate with each other. A link may be wired (the nodes being connected by a physical medium for carrying information such as electrical or optical interconnect) or wireless (the nodes being connected without a physical medium, e.g., via radio technology).

Path/Route: An example of a path/route is a sequence of one or more links.

Path Metric: An example of a path metric is a number that reflects the desirability of a path. For example, the number of links, e.g., the hop count of a path, is one possible metric. Paths with a lower hop count have advantages over paths with a higher hop count. The advantages include less resource usage (as there is reduced forwarding) and less likelihood of lost packets (as there are fewer chances for loss before packets reach respective destinations).

Best Path: An example of a best path is an ordered list of nodes that when transited (in order) by a packet result in an efficient traversal from a source to a destination, according to predetermined criteria. Since parameters and operating conditions vary over time, any best path is also a "known" best path; e.g. it is based on criteria evaluated at a particular point in time, and at a different point in time a different best path may be available. Best paths may also be considered to be "most nearly optimal" according to one or more metrics as measured with respect to a routing protocol responsible for determining the best paths.

Network: An example of a network is a set of nodes that are enabled to communicate with each other via any combination of wired and wireless links.

Mesh Network: An example of a mesh network is a set of nodes that self-organize into a multi-hop network. In some usage scenarios the mesh network has limited resources (e.g. available bandwidth, available computational power, and available energy).

Multi-Mesh Network: An example of a multi-mesh network is a set of interconnected meshes appearing to operate as a single network from a perspective of a user of resources provided by the multi-mesh network.

Shared Access Network: An example of a shared access network is a network such that a packet transmitted by any node is overheard by all other nodes in the network. An example implementation of such a network is an 802.3 LAN.

Ingress Mesh: An example of an ingress mesh is a mesh where a packet enters a multi-mesh.

Egress Mesh: An example of an egress mesh is a mesh where a packet exits (or leaves) a multi-mesh.

Ingress Mesh Node: An example of an ingress mesh node is a node where a packet enters a mesh; e.g. the node forwarding the packet from a non-mesh link onto a mesh link/network.

Egress Mesh Node: An example of an egress mesh node is a node where a packet exits a mesh; e.g. the node forwarding the packet from a mesh link onto a non-mesh link/network.

Mesh Bridge (Node): An example of a mesh bridge is a node that is simultaneously participating in more than one mesh network at a time; e.g. the node is coupled to at least two mesh networks at once. Bridge nodes enable nodes connected on a first mesh (or that are part of the first mesh) to communicate with nodes connected on a second mesh (or that are part of the second mesh).

(Mesh) Bridge Link: An example of a mesh bridge link is a link between two bridge nodes (each being coupled to a respective mesh) used to forward traffic between the two meshes.

Ingress Bridge Node: An example of an ingress bridge node is the mesh bridge where a packet exits (or leaves) an ingress mesh.

Egress Bridge Node: An example of an egress bridge node is the mesh bridge where a packet enters an egress mesh.

Mesh Portal: An example of a mesh portal is a node that is part of a mesh network and is also connected to another (shared access) network. Mesh portals enable nodes connected to the mesh, or that are part of the mesh, to communicate with nodes that are part of the shared access network, or that may be reached through the shared access network. In some embodiments the mesh network appears to outside networks as a transparent layer-2 transport, i.e. a packet injected into the mesh at one portal exits the mesh at another portal unmodified.

Ingress Mesh Portal: An example of an ingress mesh portal is the portal at which a packet enters a mesh, e.g., the portal that forwards the packet from a non-mesh link/network onto a mesh link/network.

Egress Mesh Portal: An example of an egress mesh portal is the portal at which a packet exits the mesh, e.g., the portal that forwards the packet from a mesh link/network onto a non-mesh link/network.

Mesh Client Interface: An example of a mesh client interface is an interface (that is part of a node of a mesh network) for coupling to a client device.

Mesh Network Gateway Interface (mesh NGI): An example of a mesh NGI is a node that is part of a mesh network (e.g., has an interface configured to be part of the mesh network) and is also connected to another network (e.g., has an interface configured to be on the other network). Mesh NGIs enable nodes connected to a mesh network, or that are part of the mesh, to communicate with nodes that are part of a shared access network, or that may be reached through the shared access network. In some embodiments the mesh network appears to outside networks as a transparent layer 2 transport: a packet injected into the mesh at one NGI exits the mesh at another NGI or Client Interface unmodified.

Ingress Mesh Interface: An example of an ingress mess interface is an interface at which a packet enters a mesh, e.g., the interface that forwards the packet from a non-mesh link onto a mesh link/network.

Egress Mesh Interface: An example of an egress mesh interface is the interface at which a packet exits the mesh, e.g., the interface that forwards the packet from a mesh link onto a non-mesh link/network.

Unicast: An example of unicast is communication between two nodes.

Broadcast: An example of broadcast is communication from one node intended to reach a plurality of nodes. In some usage scenarios the plurality of nodes includes all nodes on a network. In some scenarios a broadcast may not reach all intended nodes (due to packet loss, for example).

Flood: An example of a flood is a broadcast sent by a node that is in turn rebroadcast by every other node receiving the broadcast, thus potentially reaching all nodes in a network.

Routing Protocol: An example of a routing protocol is a set of mechanisms implemented on each node in a mesh network, wherein the mechanisms serve to discover information about the network and enable each node on the network to communicate with other nodes of the network, even when the other nodes are multiple hops away from the respective node.

Path Accumulation: An example of path accumulation is when each node forwarding a packet adds its respective address to the packet.

Illustrative Combinations

The following is a collection of paragraphs that tersely summarize illustrative systems and methods in accordance with the concepts taught herein. Each of the paragraphs highlights various combinations of features using an informal pseudo-claim format. These compressed descriptions are not meant to be mutually exclusive, exhaustive, or restrictive and the invention is not limited to these highlighted combinations. As is discussed in more detail in the Conclusion section, the invention encompasses all possible modifications and variations within the scope of the issued claims, which are appended to the very end of the patent.

A first embodiment comprising a method comprising determining a first route and a second route from a source node to a destination node; comparing the first and the second routes; and communicating an improved route when the second route is better than the first route. The aforementioned embodiment wherein the comparing is according to a count of hops between nodes. Any of the aforementioned embodiments wherein the communicating is conditional based in part on a retry-attempt-count being less than a predetermined threshold. Any of the aforementioned embodiments wherein the communicating is initiated by a node where the first and the second routes diverge. The aforementioned embodiment wherein the initiating node is where the first and the second routes first diverge. The first embodiment wherein a first node determining the first route and a second node determining the second route are distinct nodes or the same node. The first embodiment wherein a first node determining the first route and the source node are distinct nodes or the same node. The first embodiment wherein a second node determining the second route and the destination node are distinct nodes or the same node. The first embodiment wherein at least one of the first route and the second route is limited to a single link. The first embodiment wherein at least one of the first route and the second route comprises a plurality of links. The first embodiment wherein at least one of the first route and the second route passes through a single node. The first embodiment wherein at least one of the first route and the second route passes through a plurality of nodes.

The first embodiment wherein the communicating of the improved route is indiscriminate. The first embodiment wherein the communicating of the improved route is selective. The aforementioned embodiment wherein the selective communicating is directed to at least one of an actively communicating node and a selectively identified node. The aforementioned embodiment further comprising identifying at least one of the actively communicating node and the selectively identified node. The aforementioned embodiment wherein the selectively identified node provides a service. The aforementioned embodiment wherein the service comprises at least one of an Internet interconnectivity service and a web proxy service.

A second embodiment comprising all of the elements of the first embodiment and further comprising collecting path information used in the determining of the second route. The second embodiment wherein the path information collecting is active or passive. The aforementioned embodiment wherein the active path information collecting comprises obtaining path information in response to sending a control packet associated with the path information collecting, and the passive path information collecting is free of control packet sending. Any of the second and subsequent foregoing embodiments wherein the path information comprises information relating to topology of a mesh network. Any of the second and subsequent foregoing embodiments wherein the path information comprises accumulated path information.

A third embodiment comprising all of the elements of the second embodiment and wherein the collected path information comprises a first network address of a first node determining the first route. The aforementioned embodiment wherein the collected path information further comprises a second network address of a second node determining the second route. The aforementioned embodiment wherein the collected path information comprises a third network address of a third node that forwards traffic along a third route from the first node to the second node.

A fourth embodiment comprising a computer readable medium having a set of instructions stored therein which when executed cause functions to be performed comprising determining a first route and a second route from a source node to a destination node; comparing the first and the second routes; and communicating an improved route when the second route is better than the first route. The aforementioned embodiment wherein the comparing is according to a count of hops between nodes. Any of the fourth and subsequent foregoing embodiments wherein the communicating is conditional based in part on a retry-attempt-count being less than a predetermined threshold. Any of the fourth and subsequent foregoing embodiments wherein the communicating is initiated by a node where the first and the second routes diverge. The aforementioned embodiment wherein the initiating node is where the first and the second routes first diverge.

The aforementioned embodiment wherein the initiating node is where the first and the second routes first diverge. The fourth embodiment wherein a first node determining the first route and a second node determining the second route are distinct nodes or the same node. The fourth embodiment wherein a first node determining the first route and the source node are distinct nodes or the same node. The fourth embodiment wherein a second node determining the second route and the destination node are distinct nodes or the same node. The fourth embodiment wherein at least one of the first route and the second route is limited to a single link. The fourth embodiment wherein at least one of the first route and the second route comprises a plurality of links. The fourth embodiment wherein at least one of the first route and the second route passes through a single node. The fourth embodiment wherein at least one of the first route and the second route passes through a plurality of nodes.

The fourth embodiment wherein the communicating of the improved route is indiscriminate. The fourth embodiment wherein the communicating of the improved route is selective. The aforementioned embodiment wherein the selective communicating is directed to at least one of an actively communicating node and a selectively identified node. The aforementioned embodiment further comprising identifying at least one of the actively communicating node and the selectively identified node. The aforementioned embodiment wherein the selectively identified node provides a service. The aforementioned embodiment wherein the service comprises at least one of an Internet interconnectivity service and a web proxy service.

A fifth embodiment comprising all of the elements of the fourth embodiment and further comprising collecting path information used in the determining of the second route. The fifth embodiment wherein the path information collecting is active or passive. The aforementioned embodiment wherein the active path information collecting comprises obtaining path information in response to sending a control packet associated with the path information collecting, and the passive path information collecting is free of control packet sending. Any of the fifth and subsequent foregoing embodiments wherein the path information comprises information relating to topology of a mesh network. Any of the fifth and subsequent foregoing embodiments wherein the path information comprises accumulated path information.

A sixth embodiment comprising all of the elements of the fifth embodiment and wherein the collected path information comprises a first network address of a first node determining the first route. The aforementioned embodiment wherein the collected path information further comprises a second network address of a second node determining the second route. The aforementioned embodiment wherein the collected path information comprises a third network address of a third node that forwards traffic along a third route from the first node to the second node.

A seventh embodiment comprising a system comprising a wireless mesh network having at least two nodes; wherein each of the nodes comprises a respective wireless interface enabling communication with at least two other nodes; wherein each of the nodes comprises a respective processing element executing wireless mesh networking functions, the functions comprising a path determination function to determine a path between two nodes of the wireless mesh network, a path comparison function to compare two paths determined by the path determination function, and a path dissemination function to control distribution of path information to nodes of the wireless mesh network; wherein the path dissemination function distributes a new path when the path comparison function indicates a better path is available. The aforementioned embodiment wherein the comparison function compares hop counts between nodes. Any of the seventh and subsequent foregoing embodiments wherein the dissemination is conditional based in part on a retry-attempt count being less than predetermined threshold. Any of the seventh and subsequent foregoing embodiments wherein the dissemination is initiated by a node where the new path diverges from a previous path.

The aforementioned embodiment wherein the initiating node is where the first and the second routes first diverge. The seventh embodiment wherein a first node determining the first route and a second node determining the second route are distinct nodes or the same node. The seventh embodiment wherein a first node determining the first route and the source node are distinct nodes or the same node. The seventh embodiment wherein a second node determining the second route and the destination node are distinct nodes or the same node. The seventh embodiment wherein at least one of the first route and the second route is limited to a single link. The seventh embodiment wherein at least one of the first route and the second route comprises a plurality of links. The seventh embodiment wherein at least one of the first route and the second route passes through a single node. The seventh embodiment wherein at least one of the first route and the second route passes through a plurality of nodes.

The seventh embodiment wherein the communicating of the improved route is indiscriminate. The seventh embodiment wherein the communicating of the improved route is selective. The aforementioned embodiment wherein the selective communicating is directed to at least one of an actively communicating node and a selectively identified node. The aforementioned embodiment further comprising identifying at least one of the actively communicating node and the selectively identified node. The aforementioned embodiment wherein the selectively identified node provides a service. The aforementioned embodiment wherein the service comprises at least one of an Internet interconnectivity service and a web proxy service.

An eighth embodiment comprising all of the elements of the seventh embodiment and further comprising collecting path information used in the determining of the second route. The eighth embodiment wherein the path information collecting is active or passive. The aforementioned embodiment wherein the active path information collecting comprises obtaining path information in response to sending a control packet associated with the path information collecting, and the passive path information collecting is free of control packet sending. Any of the eighth and subsequent foregoing embodiments wherein the path information comprises information relating to topology of a mesh network. Any of the eighth and subsequent foregoing embodiments wherein the path information comprises accumulated path information.

A ninth embodiment comprising all of the elements of the tenth embodiment and wherein the collected path information comprises a first network address of a first node determining the first route. The aforementioned embodiment wherein the collected path information further comprises a second network address of a second node determining the second route. The aforementioned embodiment wherein the collected path information comprises a third network address of a third node that forwards traffic along a third route from the first node to the second node.

Routing Information and Discovery

Nodes retain and use routing information in part when performing various networking protocols. Routing information is discovered and propagated between nodes during operation of a network. As network topology changes over time (such as due to movement of nodes, addition of nodes, removal of nodes, and changes in environmental conditions affecting communication between nodes), new routing information is learned and in some cases distributed via any combination of active (i.e. including originating control packets) and passive (i.e. without originating control packets) techniques, according to embodiment.

Routing Information

Each node in a mesh network implements a data structure, e.g., a "Route Cache", describing links in the network that the node has learned. Nodes use various techniques to combine the link information into paths/routes. Then an "originating" node may use the path/route information to send packets to various destination nodes, including nodes that may be multiple hops away from the originating node.

FIG. 1 illustrates selected details of an embodiment of a mesh network and associated path computation, a path through the network, and various entries in a route cache. More specifically, the mesh network includes nodes "S" 100S, "A" 100A, "B" 100B, "C" 100C, "D" 100D, "E" 100E, "F" 100F, "G" 100G, "H" 10011, and "J" 100J. A path is illustrated starting from "S" and reaching "D", via "B", "E", "F", and "J". A route cache implemented by "S" describes various links in the network, including ("S", "A"), ("S", "B"), ("B", "E"), ("E", "F"), ("F", "J"), ("J", "D"), and ("G", "H"). A path from "S" to "D" exists and may be represented as [("S", "B"), ("B", "E"), ("E", "F"), ("F", "J") ("J", "D")].

Discovery of Routing Information

A node participating in a mesh network (also known as a "mesh node") and executing an on-demand routing protocol examines a Route Cache implemented in the node during processing associated with sending a packet to a destination. If the Route Cache lacks information describing a path (or route) to the destination, then the node, acting as an originator, initiates a "Route Discovery" operation to find a route.

The Route Discovery starts with a "Route Request" flood that is broadcast by the originator and subsequently rebroadcast by all nodes receiving the Route Discovery. The rebroadcast operations continue until the Route Discovery is flooded throughout all nodes of the network. In embodiments implementing a routing protocol using path accumulation during Route Discovery, as the Route Request is forwarded by each node, each respective node adds the address of the respective node to a list of addresses in a header of a packet associated with the Route Request. As a result, each node receiving the Route Request is provided with information describing nodes that have forwarded a copy of the Route Request and each node is enabled to "learn" about all the links traversed by the Route Request.

When a Route Request packet reaches the destination, the packet contains a list of nodes/links (i.e., a path) from the originator (or source) node to the destination node. The destination node then places the path inside a "Route Reply" packet and sends the Route Reply to the originator of the Route Discovery to inform the originator about the links and the route that were discovered as part of the Route Discovery. Since the Route Reply is directed to the originator, communication of updated routing information is naturally limited to the originator (and nodes along a path from the destination to the originator). In some embodiments, Route Reply information is optionally directed to selected additional nodes other than the originator. In some embodiments the additional nodes selected to receive Route Reply information are identified by a user. In some embodiments the additional nodes are selected based on identification as providers of a service, the service including any combination of Internet interconnectivity and web proxy. In some embodiments additional nodes are identified as nodes likely to require or benefit from new route information in the near future.

Figure 2:
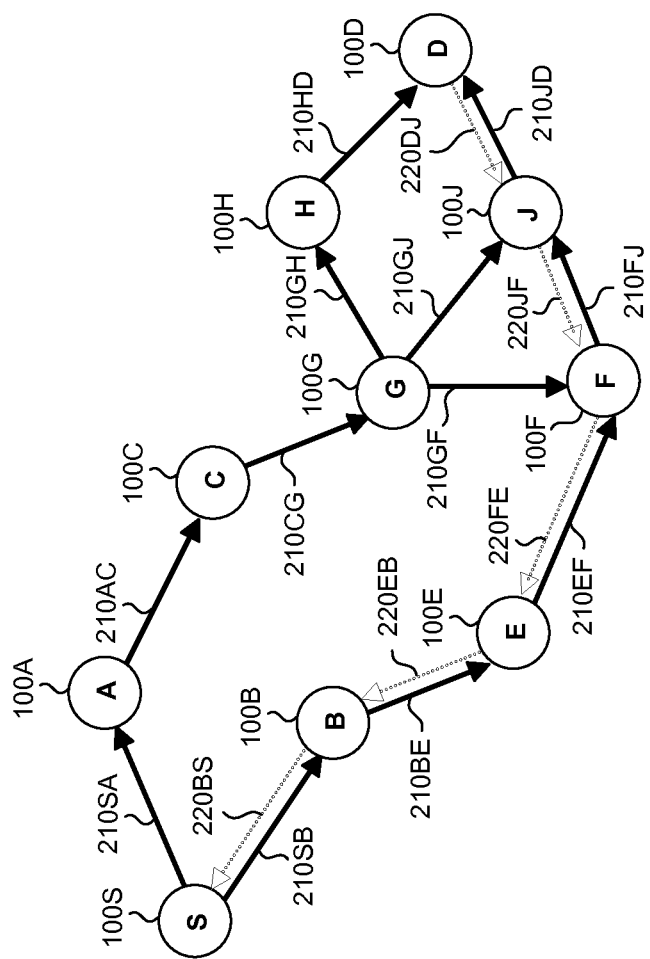
FIG. 2 illustrates selected details of an embodiment of mesh network Route Discovery processing, including a Route Request and a Route Reply.

FIG. 2 illustrates selected details of an embodiment of mesh network Route Discovery processing, including a Route Request and a Route Reply. More specifically, the mesh network includes nodes "S" 100S, "A" 100A, "B" 100B, "C" 100C, "D" 100D, "E" 100E, "F" 100F, "G" 100G, "H" 100H, and "J" 100J of FIG. 1. A Route Discovery operation is originated by node "S" to destination node "D". Consider a scenario where only a single copy of a Route Request flood is forwarded by each node, as illustrated by Route Requests 210SA, 210SB, 210AC, 210CG, 210GH, 210GJ, 210GF, 210HD, 210JD, 210FJ, 210EF, and 210BE. If the first copy of the Route Request reaching node "J" is from node "F", and the first copy of the Route Request reaching node "F" is from node "E", then all illustrated links except ("G", "J") and ("G", "F") will be learned by node "D". A Route Reply is generated by node "D", and returns a route described as ["S", "B", "E", "F", "J", "D"], as illustrated by Route Replies 220DJ, 220JF, 220FE, 220EB, and 220BS.

In some usage scenarios different copies of a Route Request follow different paths within the network. As a result, a node may receive more than one Route Request belonging to the same Route Discovery. To enable duplicate detection, the originator of the Route Request includes in the Route Request a sequence number that is unique to the originator. Forwarding nodes then use the sequence number to identify Route Request packets belonging to the same Route Discovery. In some embodiments nodes implement a Route Request table that includes entries having source address and corresponding sequence number information. The Route Request table is updated as Route Requests are received, and searched to identify a duplicate Route Request. In some embodiments each node in the mesh forwards a fixed number of copies of a Route Request when processing a given Route Discovery. The fixed number may be one, two, three, or any other similar quantity, according to various implementations. In some usage scenarios one or more copies of a Route Request may follow respective distinct routes. If so, then during a single Route Discovery, the destination of the Route Discovery may learn multiple routes to the source (i.e. multiple paths to the initiator of the Route Discovery). In some embodiments multiple copies of a Route Request are forwarded to make it more likely that multiple routes may be discovered, even though only a single route may exist, or potential additional routes may be temporarily obscured due to intermittent packet loss.

Information received in response to a Route Request represents state of the network over the period of time during which the Route Request is originated until it reaches the target. Another Route Request originated at a later (or earlier) time may gather different information, as network topology may change over time. Changes in network topology may be a result of nodes moving from one physical location to another, nodes being added to or removed from the network, or changes in environmental conditions such that communication between some nodes is improved (or degraded). Generally the changes to network topology are discovered and learned over time as Route Requests move through the network. More efficient paths replace (in a Route Cache context, for example) less efficient paths, and operational paths replace non-operational paths.

For example, a first node enabling a first path between an originator and a target may be operational at a first time when a first Route Request is active in the network. Continuing with the example, a second node enabling a second path between the originator and the target may be operational at a second time (and not during the first time) when a second Route Request is active in the network. If the second time is after the first time and the second path is more efficient than the first, then nodes will learn the second path and may use information relating to it to replace information relating to the less efficient first path.

Route Optimization

During a Route Discovery flood, nodes in the network learn about currently available links in the network and properties associated with the nodes, the links, or both. The properties, or information, may be useful not to only to the destination of the Route Discovery but also to other nodes in the network that are sending traffic. The information may be useful since new and better paths may have become available in the network as a result of node movement, changes in link characteristics, or other similar modifications to the mesh network. The following are summaries of selected "Route Optimization" mechanisms making use of the information to improve network performance.

Upon receipt of any Route Discovery flood, a node that is the destination of active flows from the originator of the Route Discovery examines the associated Route Request packet and determines (or learns) any new links. The destination node then checks to see if any of the new links, optionally combined with routing information the destination is already aware of, result in an improved route to the originator of the Route Request. If so, then the destination node returns a Route Reply with the better route to the originator of the flood.

In usage scenarios where compute power is relatively unconstrained (i.e. freely available), a node may optionally re-compute routes to one or more nodes (or all nodes) the node is in active communication with. The recomputed routes are then compared to currently known routes. For each of the better routes found (if any) a Route Reply is sent to the node accessible via the respective better route. In some embodiments the route comparison includes comparing numbers of hops associated with the routes being compared. The result is that a Route Reply is provided to each node for which an improved route has become available. In some embodiments initiation of Route Replies is optionally rate limited to limit Route Reply packets transmitted to one or more nodes.

In some embodiments each node may periodically re-compute all routes (or any portion thereof) for all active communication flows (or any portion thereof) for which the node is a source, a destination, or a forwarding node. The node may then optionally compare the recomputed routes with previously known routes, to determine if there are better routes available. If the node is a source of traffic and the node discovers a better route, then the node may start to use the better (or new) route immediately. If the node is a destination, then the node may send a Route Reply to the source of the flow. If the node is a forwarding node for a traffic flow, then the node may compare the new (and better) route to the route currently used by the flow. If a next hop toward the source of the flow via the new route is different from a next hop toward the source via the current route, then a Route Reply may be sent. Accordingly only a node adjacent to where the new and current routes differ originates a Route Reply, and only a single Route Reply is sent for a newly detected improved (or shortened) path, even though a plurality of nodes may detect the improved path. If the flow source continues to use an old route, then corresponding Route Replies may be sent in response. In some embodiments after several attempts Route Replies are no longer sent, to account for usage scenarios where the source may be using a less nearly optimal (or apparently so) route for reasons not known by the forwarding node.

Figure 3A:
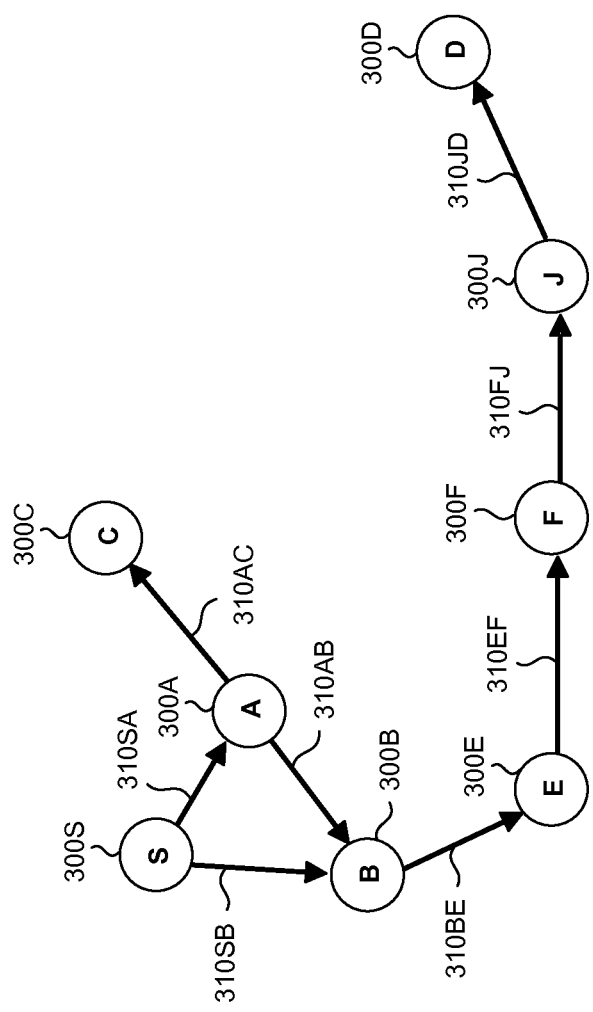
FIGS. 3A and 3B illustrate a time-sequence operational view of selected aspects of an embodiment of mesh routing optimization.
Figure 3B:
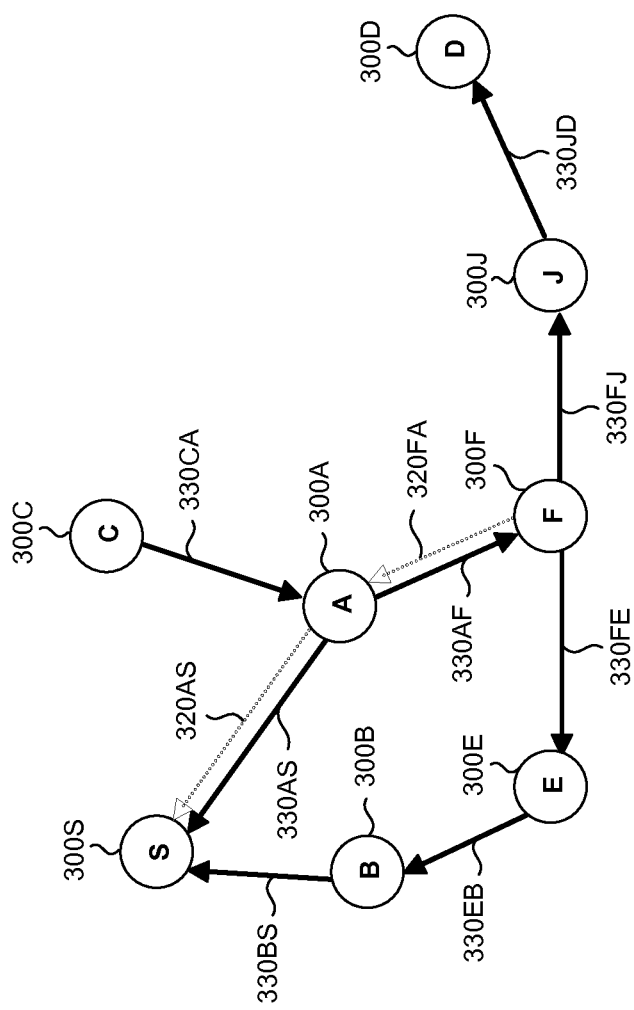

FIGS. 3A and 3B illustrate a time-sequence operational view of selected aspects of an embodiment of mesh routing optimization. More specifically, FIG. 3A illustrates a mesh network including nodes "S" 300S, "A" 300A, "B" 300B, "C" 300C, "D" 300D, "E" 300E, "F" 300F, and "J" 300J. If node "S" performs a Route Discovery to node "D" (in usage scenarios where each node forwards two or more copies of each Route Request, as illustrated by Route Requests 310SA, 310SB, 310AC, 310AB, 310BE, 310EF, 310FJ, and 310JD), then the nodes "B", "E", and "F" would learn link ("S", "A"). Consider a situation where the best route between node "S" and node "D" is determined to be ["S", "B", "E", "F", "J", "D"] and that node "S" uses path ["S", "B", "E", "F", "J", "D"] to route packets to node "D".

FIG. 3B illustrates the mesh network of FIG. 3A, at a later point in time compared to that of FIG. 3A, when node "A" has moved so that node "A" may communicate (i.e. establish and maintain a link) with node "F" while still having links to nodes "S" and "C". If node "C" initiates a Route Discovery (to any node), then nodes "F", "J", and "D" would learn of a better path to "S" via "A". An example route discovery initiated from node "C" is illustrated by Route Requests 330CA, 330AS, 330AF, 330FJ, 330JD, 330FE, 330EB, and 330BS. When performing periodic route re-computation, each of nodes "F", "J", and "D" detect the shorter path. However, only node "F" sends a Route Reply to "S" (illustrated by Route Replies 320FA, and 320AS) describing the new route, ["S", "A", "F", "J", "D"], since node "F" is the node where the path has been improved (or shortened). Originating the Route Reply from a selected node where the new and old routes differ ensures that only a single Route Reply is sent for the newly detected better path, even though more than one node may detect the better path.

In the foregoing description the best path is the route having the shortest hop count metric. Other metrics for determining the best path may be used based on implementation dependent criteria, as the aforementioned techniques are independent of details of best path determination details.

In some embodiments processing relating to originating the Route Reply from a selected node includes background processing of link information learned through all floods (or any portion thereof) sent by any node within a period of time, and may also include optional processing of information relating to new neighboring links. Computational overhead is incurred only when new or better routes are not available (i.e. processing is "wasted" in the sense that no improvements are found). A small amount of control packet overhead (i.e. Route Reply packet traffic) is incurred when improved routes are discovered and communicated. In some implementations nodes that are actively sourcing traffic may periodically originate Route Discovery floods with no specific target destination, thus providing opportunities to refresh (or improve) routing information in absence of otherwise occurring Route Discovery floods.

In some embodiments or usage scenarios Route Discovery is with respect to a single target; i.e. directed to find a route to one destination. In some embodiments or usage scenarios Route Discovery is with respect to a plurality of targets; i.e. directed to find routes to a plurality of destinations. If Route Discovery is with respect to a single target, then the associated Route Request is not propagated by the target, since the route to be discovered is then known, and thus the target (or destination) address is not included in accumulated path information. If Route Discovery is with respect to more than one target, then the associated Route Request may be forwarded by any number of the targets, as each target individually is not aware of whether or not all targets have received the request, and thus the forwarding targets may each appear in accumulated path information.

The techniques illustrated by the aforementioned embodiments are applicable to mesh networks (wired and wireless), ad hoc networks (wired and wireless), as well as other similar self-organizing networks and networks having topology that changes over time.

Node Hardware and Software

Figure 4:
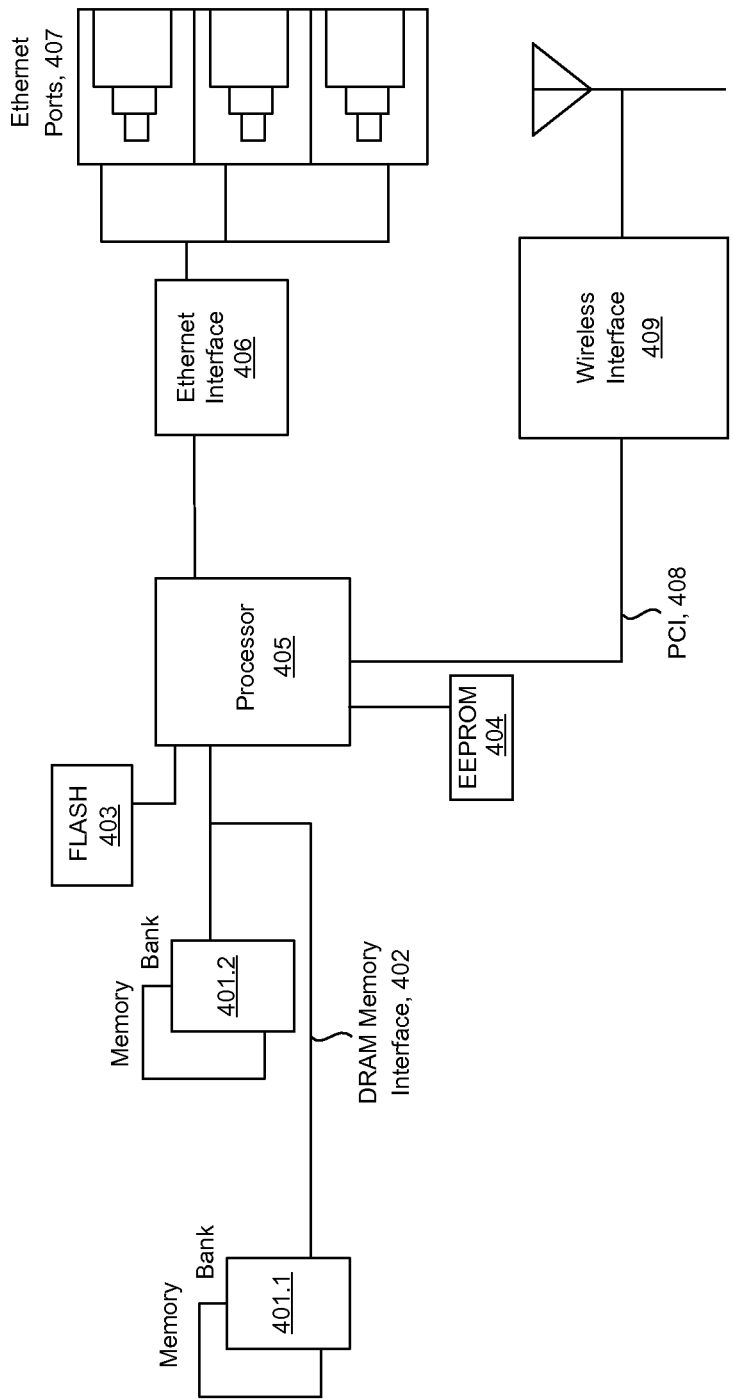
FIG. 4 illustrates selected details of hardware aspects of an embodiment of a node.

FIG. 4 illustrates selected details of hardware aspects of an embodiment of a node. The illustrated node includes Processor 405 coupled to various types of storage, including volatile read/write memory "Memory Bank" elements 401.1-2 via DRAM Memory Interface 402, and non-volatile read/write memory FLASH 403 and EEPROM 404 elements. The processor is further coupled to Ethernet Interface 406 providing a plurality of Ethernet Ports 407 for establishing wired links, and Wireless Interface 409 providing radio communication of packets for establishing wireless links. In some embodiments the Wireless Interface is compatible with an IEEE 802.11 wireless communication standard (such as any of 802.11a, 802.11b, and 802.11g). In some embodiments the Wireless Interface operates (in conjunction with any combination of hardware and software elements) to collect statistics with respect to neighboring nodes of a mesh. The statistics may include any combination of signal strength and link quality. In some embodiments the Wireless Interface is configurable to drop all packets below a settable Received Signal Strength Indicator (RSSI) threshold. The illustrated partitioning is only one example, as other equivalent embodiments of a node are possible.

The illustrated node may function as any one of the nodes illustrated in FIGS. 1, 2, 3A, and 3B. The Wireless Interface of FIG. 4 may enable communication between nodes and provide low-level transport for Route Request and Route Reply packets.

In operation the processor fetches instructions from any combination of the storage elements (DRAM, FLASH, and EEPROM) and executes the instructions. Some of the instructions correspond to software associated with Route Request, Route Reply, and route optimization operations. Route cache information may be stored in any combination of the storage elements according to instructions executed during processing associated with Route Reply processing.

FIG. 5 illustrates selected details of software aspects of an embodiment of a node. The illustrated software includes Network Management Software (NMS) Manager 501 interfacing to Network Interface Manager 502 and Fault, Configuration, Accounting, Performance, and Security (FCAPS) Manager 503. Kernel Interface 510 interfaces the Managers to Routing and Transport Protocols layer 511 and Flash File System module 513. The Routing Protocols include portions of processing relating to Route Request generation, Route Reply interpretation, and route cache management. The Transport Protocols include TCP and UDP. The Flash File System module interfaces to Flash Driver 516 that is illustrated conceptually coupled to FLASH hardware element 523 that is representative of a flash file system stored in any combination of the FLASH and EEPROM elements of FIG. 4. Layer-2 Abstraction Layer 512 interfaces the Routing and Transport Protocols to Ethernet and Radio Drivers 514 and 515, respectively. The Ethernet Driver is illustrated conceptually coupled to Ethernet Interface 526 that is representative of the Ethernet Interface of FIG. 4. The Radio Driver is illustrated conceptually coupled to Wireless Interface 529 that is representative of the Wireless Interface of FIG. 4. In some embodiments the software may also include a serial driver. The software is stored on a computer readable medium (e.g. any combination of the DRAM, FLASH, and EEPROM elements), and is executed by the processor. The illustrated partitioning is an example only, as many other equivalent arrangements of layers are possible.

CONCLUSION

Although the foregoing embodiments have been described in some detail for purposes of clarity of understanding, the invention is not limited to the details provided. There are many alternative ways of implementing the invention. The disclosed embodiments are illustrative and not restrictive. It will be understood that many variations in construction, arrangement and use are possible consistent with the teachings and within the scope of the claims appended to the issued patent. For example, interconnect and function-unit bit-widths, clock speeds, and the type of technology used may generally be varied in each component block. The order and arrangement of flowchart and flow diagram process and function elements may generally be varied. Also, unless specifically stated to the contrary, the value ranges specified, the maximum and minimum values used, or other particular specifications (such as integration techniques and design flow technologies), are merely those of the illustrative embodiments, can be expected to track improvements and changes in implementation technology, and should not be construed as limitations.

Functionally equivalent techniques known to those of ordinary skill in the art may be employed instead of those illustrated to implement various components, sub-systems, functions, operations, routines, and sub-routines. The names given to interconnect, logic, functions, and routines are merely illustrative, and should not be construed as limiting the concepts taught. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in networking technology (such as wired/wireless, protocols, and bandwidths); and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components without altering the basic cooperation among the remaining elements. It is thus understood that much of the details disclosed are not required to implement various aspects of the concepts taught. To the extent that the remaining elements are distinguishable from the prior art, omitted components are not limiting on the concepts taught herein.

All such variations in design comprise insubstantial changes over the teachings conveyed by the illustrative embodiments. It is also understood that the concepts taught herein have broad applicability to other networking and communication applications, and are not limited to the particular application or industry of the illustrated embodiments. The invention is thus to be construed as including all possible modifications and variations encompassed within the scope of the claims appended to the issued patent.

What is claimed is:

1. A system comprising:
    a wireless mesh network of nodes;
    wherein each of the nodes comprises a respective processing element enabled to execute wireless mesh networking functions;
    wherein the wireless mesh networking functions comprise
        a node of divergence function to determine when the node is a first node of divergence between a current best path and a previous best path, and
        a path dissemination function to conditionally distribute the current best path at least in response to a determination that the current best path has changed from the previous best path and a determination that the node is the first node of divergence; and
    wherein the first node of divergence has at least a first link, a second link, and a third link to respective others of the nodes, the current best path comprises the first link and the second link, and the previous best path comprises the first link and the third link.

2. The system of claim 1, wherein the path dissemination function conditionally distributes a new path to a plurality of recipients when a better path is available.

3. The system of claim 2, wherein at least one of the recipients provides a service.

4. The system of claim 3, wherein the service is at least one of an Internet connectivity service and a web proxy service.

5. The system of claim 1, wherein the wireless mesh networking functions further comprise a path determination function to determine a path between two nodes of the wireless mesh network.

6. The system of claim 5, wherein the wireless mesh networking functions further comprise a path comparison function to compare a first path determined by the path determination function with a second path determined by the path determination function.

7. The system of claim 1, wherein the conditional distribution is further conditioned on a determination that a retry-attempt-count is less than a predetermined threshold.

8. The system of claim 1, wherein the wireless mesh networking functions further comprise a path comparison function to provide an indication of availability of a better path and a path accumulation function to generate a packet.

9. The system of claim 1, wherein the wireless mesh networking functions further comprise a path comparison function to provide an indication of availability of a better path and a path accumulation function to observe a packet.

10. The system of claim 1, wherein the wireless mesh networking functions further comprise a path comparison function to provide an indication of availability of a better path, and a path accumulation function to accumulate path information referenced by the path comparison function; and wherein the accumulated path information comprises topology information.

11. The system of claim 1, wherein the wireless mesh networking functions further comprise a path comparison function to provide an indication of availability of a better path, and a path accumulation function to accumulate path information referenced by the path comparison function; and wherein the accumulated path information comprises a network address of a forwarding node.

12. The system of claim 1, wherein the wireless networking functions are specified by a computer readable medium.

13. The system of claim 12, further comprising the computer readable medium.

14. A device enabled to operate as one of the nodes of a wireless mesh network, the device comprising:
    a wireless interface enabled to communicate with respective others of the nodes via at least a first link, a second link, and a third link; and
    a processing element enabled to execute wireless mesh networking functions, the wireless mesh networking functions comprising:
        a node of divergence function to determine when the device is a first node of divergence between a current best path, comprising the first link and the second link, and a previous best path, comprising the first link and the third link, and
        a path dissemination function to conditionally distribute the current best path at least in response to a determination that the current best path has changed from the previous best path and a determination that the device is the first node of divergence.

15. The device of claim 14, wherein when the device is a source node of a particular traffic flow of a plurality of active traffic flows, and the device is enabled to use the current best path immediately.

16. The device of claim 14, wherein the conditional distribution is further conditioned on a determination that a retry-attempt-count is less than a predetermined threshold.

17. The device of claim 14, wherein the conditional distribution is via a route reply, and only a single route reply is sent for the current best path, even when others of the nodes detect the current best path has changed from the previous best path.

18. A method comprising:
    in a mesh network of nodes, in any one or more of the nodes, computing a first route from a source node of the nodes to a destination node of the nodes, the first route comprising a first link and a second link between a particular one of the nodes and respective others of the nodes;
    in any one or more of the nodes, computing a second route from the source node to the destination node, the second route comprising the first link and a third link between the particular one of the nodes and respective others of the nodes;
    in the particular node of the nodes, determining when the particular node is a first node of divergence between the first route and the second route; and
    further in the particular node, in response to ascertaining that the second route is an improved route with respect to the first route, conditionally communicating the improved route to a plurality of recipients such that the particular node communicates the improved route when the determining is positive, and the particular node is silent about the improved route when the determining is negative.

19. The method of claim 18, further comprising, in any one or more of the nodes, comparing the first route to the second route according to a comparison criteria, and wherein the comparison criteria comprises a count of hops between the source node and the destination node.

20. The method of claim 18, wherein the first node of divergence compares the first route to the second route and performs the computing the second route.

* * * * *